July 12, 1949.  A. C. GODDARD  2,476,142
NONMETALLIC COVER FOR BREAD TOASTERS
Filed April 7, 1948
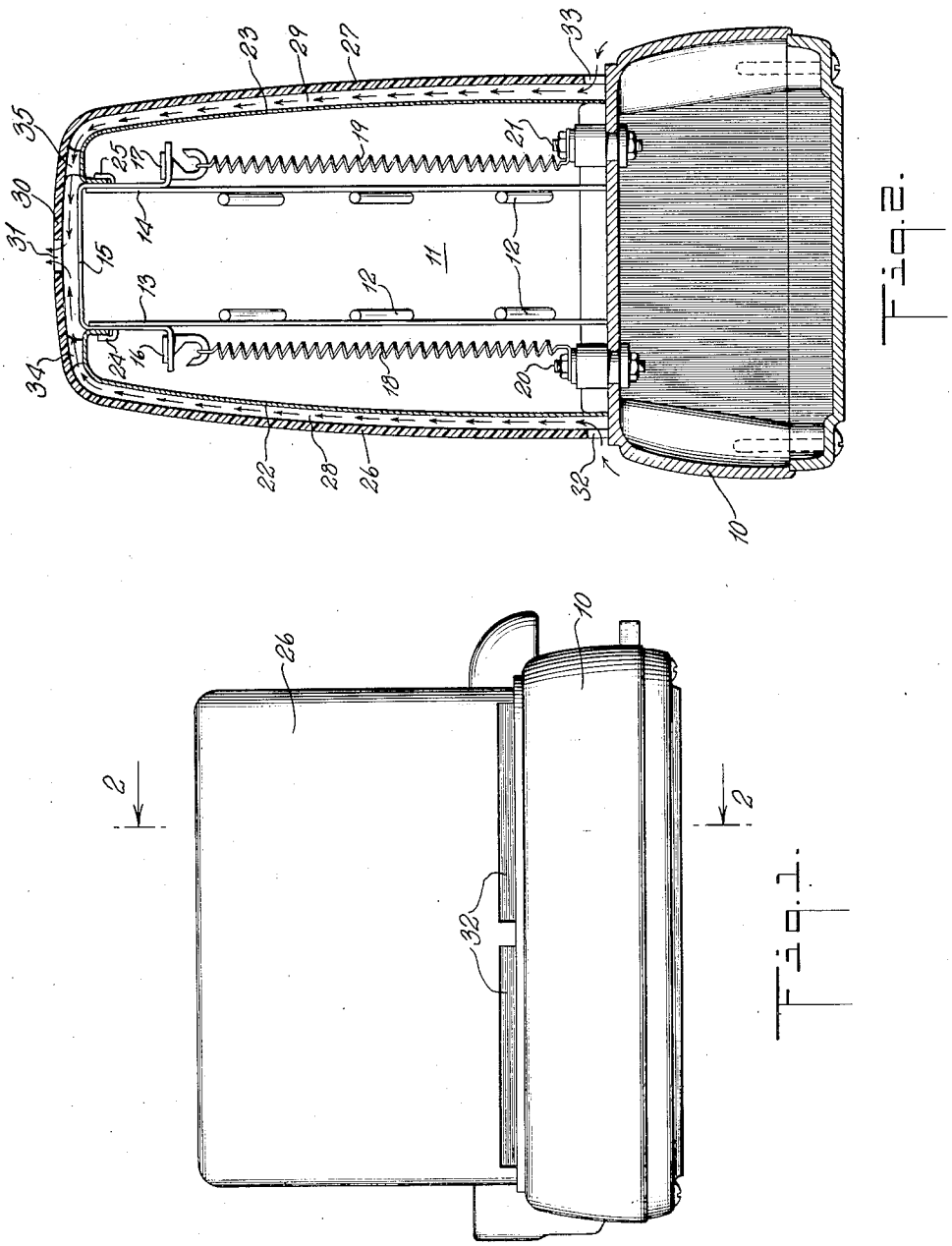
INVENTOR.
ALVIN C. GODDARD
BY
Benj. T. Rauber
ATTORNEY Patented July 12, 1949

2,476,142

UNITED STATES PATENT OFFICE 2,476,142

NONMETALLIC COVER FOR BREAD TOASTERS

Alvin C. Goddard, Long Island City, N. Y., assignor to Toast-O-Lator Co., Inc., Long Island City, N. Y., a corporation of New York Application April 7, 1948, Serial No. 19,479

1 Claim. (Cl. 219—19)

My present invention relates to a toaster and more particularly to a wall construction whereby the outer surface of the toaster will be insulated against the heat of the toasting elements.

Heretofore the toasting elements of toasters have been contained within a metal cover or shell, generally with a highly polished outer surface. As the toaster becomes hot this cover or shell reaches a temperature sufficient to cause a burn if it is touched.

In my present invention I provide a cover for toasters of a type which is protected from the heat radiated or otherwise transmitted from the toasting elements. This cover is preferably of a non-heat conducting material, such as a molded plastic or other non-metallic material and an inner shield which may be of metal between the outer cover and the heating elements of the toaster and slightly spaced from the outer cover or shell to form an insulating or heat-absorbing air space. Suitable ventilating openings are provided to permit the entrance of air into the space between the outer shell or cover and the shield and to pass upwardly therethrough and to be vented at the outer or top part of the shell. The inner shield intercepts the heat radiated or transmitted from the heating coils of the toaster. The heat thus absorbed by the shield is intercepted and absorbed by the air in the air space which moving upwardly carries the heat away. The cover is thus kept relatively cool so that it will not burn if touched.

The various features of the invention are illustrated by way of example in the accompanying drawings in which Fig. 1 is a side view of a toaster embodying my invention;

Fig. 2 is a section on a larger scale taken on the line 2—2 of Fig. 1.

In the embodiment shown in the accompanying drawing the invention is applied to a toaster in which the bread is fed edgewise through one end of the toaster and passes horizontally through the toaster and out the opposite end, being toasted in its travel through the toaster. The moving elements of the toaster are mounted in a base 10 and the bread to be toasted passes through a channel 11 and between a pair of lengthwise extending guide wires 12 on opposite sides of the channel. These wires are supported at their ends on a framework having uprights 13 and 14 on opposite sides of the channel and joined by a yoke 15 at the top. Suspended from brackets 16 and 17 mounted on the uprights 13 and 14 near the upper ends thereof are heating coils 18 and 19 the lower ends of which are held by bolts or other suitable fastening means 20 and 21 secured to the base 10. The elements for moving bread through the channel 11 are not shown as they are of known construction and form no part of the present invention.

Enclosing the heating elements 18 and 19 and spaced from them are plates or shields 22 and 23 the upper ends of which are reversely and downwardly bent to rest in channels 24 and 25 on the upper ends of the supports or uprights 13 and 14. The lower ends of the shields may rest on the base 10 or on suitable supports mounted on the base. The shields 22 and 23 are made of metal to intercept heat radiated directly from the heating wires 18 and 19, or otherwise transmitted from them. Some of this heat may be reflected to the bread being toasted.

Enclosing the shields 22 and 23 is an outer cover or mantle made of non-heat conducting material or a material of low heat conductivity such as a thermosetting plastic or a thermoplastic material. This mantle comprises a pair of side walls 26 and 27 resting at their lower edges on the base 10 and slightly spaced from the shields 22 and 23 to form air passages or spaces 28 and 29. The side walls 26 and 27 of the cover or mantle are continued in a top portion 30 above the upper ends of the shields 22 and 23 and cross piece 15 of the frame. An opening 31 is provided in the top part 30. Vent openings 32 and 33 are provided in the lower edges of the walls 26 and 27 so that cool air may enter through the passages 22 and 23, thence flow upwardly through the passages 28 and 29 and then through the outlet 31. The air spaces 28 and 29 serve not only to insulate cover from the shields 22 and 23 but also to provide a cooling current of air.

To prevent accidental contact of the cover with the shield suitable non-conducting spacers such as those shown at 34 and 35 are provided.

Through the above invention the cover of the toaster is kept relatively cool, the heat being confined by the shields 22 and 23. Inasmuch as the shields 22 and 23 are not exposed to view they need not be finished with a high polish thus saving considerable expense in the making of the cover. As the cover may be made of a molded thermosetting or thermoplastic material it may be made cheaply and with a surface which does not require polishing or finishing.

Having described my invention, what I claim is:

A toaster having a lower supporting base, a pair of spaced vertical heating elements above said base to form a passage between said elements for toasting bread, a non-metallic cover for said heating elements extending on each side and over the top thereof and having vertical openings aligned with said passage, and a metallic shield within and spaced from said cover to intercept heat from said heating elements, said cover having lower and upper vents for the admission to and exhaust of air from the space between said cover and said shield.

ALVIN C. GODDARD.

REFERENCES CITED

The following references are of record in the file of this patent:

UNITED STATES PATENTS

| Number | Name | Date |
|---|---|---|
| 1,820,885 | Le Vine | Aug. 25, 1931 |
| 1,857,639 | Jancke | May 10, 1932 |
| 1,907,650 | McLelland et al. | May 9, 1933 |
| 1,963,409 | Johnson | June 19, 1934 |